United States Patent
Knoppert et al.

(10) Patent No.: US 11,507,160 B2
(45) Date of Patent: Nov. 22, 2022

(54) DEVICE CHARGER WITH ACCESSORY BAYS

(71) Applicant: Dell Products, L.P., Round Rock, TX (US)

(72) Inventors: Michiel Sebastiaan Emanuel Petrus Knoppert, Amsterdam (NL); Mark R. Ligameri, Santa Rosa, FL (US)

(73) Assignee: Dell Products, L.P., Round Rock, TX (US)

( * ) Notice: Subject to any disclaimer, the term of this patent is extended or adjusted under 35 U.S.C. 154(b) by 343 days.

(21) Appl. No.: 16/733,075

(22) Filed: Jan. 2, 2020

(65) Prior Publication Data

US 2021/0208652 A1    Jul. 8, 2021

(51) Int. Cl.
| | | |
|---|---|---|
| G06F 1/26 | (2006.01) | |
| G06F 13/42 | (2006.01) | |
| H02J 7/00 | (2006.01) | |
| H04W 76/10 | (2018.01) | |
| H04W 76/30 | (2018.01) | |
| H04R 1/10 | (2006.01) | |
| H04W 84/12 | (2009.01) | |
| H04W 4/80 | (2018.01) | |

(52) U.S. Cl.
CPC .......... *G06F 1/266* (2013.01); *G06F 13/4282* (2013.01); *H02J 7/0045* (2013.01); *H02J 7/0047* (2013.01); *H04R 1/1016* (2013.01); *H04R 1/1025* (2013.01); *H04R 1/1041* (2013.01); *H04W 76/10* (2018.02); *H04W 76/30* (2018.02); *G06F 2213/0042* (2013.01); *H04W 4/80* (2018.02); *H04W 84/12* (2013.01)

(58) Field of Classification Search
CPC ............... G06F 1/266; G06F 13/4081; G06F 13/4282; G06F 2213/0042; G06F 1/1632; G06F 1/1656; G06F 1/181; H04W 76/10; H04W 76/30; H04W 4/80; H04W 84/12; H02J 7/0045; H02J 7/0047; H04R 1/1016; H04R 1/1025; H04R 1/1041
See application file for complete search history.

(56) References Cited

U.S. PATENT DOCUMENTS 7,221,932 B2 *  5/2007  Ido ........................ G06F 21/445
                                                    380/247
8,655,161 B1 *  2/2014  Chen ..................... G03B 17/14
                                                    396/533

(Continued)

OTHER PUBLICATIONS

"PCMag Encyclopedia". Entry'power adapter'. Retrieved from Internet Aug. 9, 2022. <https://www.pcmag.com/encyclopedia/term/power-adapter>. (Year: 2022).*

(Continued)

*Primary Examiner* — Thomas J. Cleary
(74) *Attorney, Agent, or Firm* — Fogarty LLP (57) ABSTRACT

A device charger with accessory bays is described. In some embodiments, an Information Handling System (IHS) may include: a processor; and a memory coupled to the processor, the memory having program instructions stored thereon that, upon execution by the processor, cause the IHS to: receive an indication, from a device charger coupled to the IHS, that an accessory has been ejected from the device charger; and in response to the indication, connect to the accessory.

19 Claims, 5 Drawing Sheets

(56) References Cited

U.S. PATENT DOCUMENTS

| | | | | |
|---|---|---|---|---|
| 10,123,104 B1* | 11/2018 | Shao | ................... | H04R 1/1016 |
| 10,464,675 B1* | 11/2019 | Rabii | ................. | H04N 21/4126 |
| 11,140,481 B2* | 10/2021 | Marino | ................... | H04R 5/02 |
| 2004/0198430 A1* | 10/2004 | Moriyama | ............ | G06F 3/1415 |
| | | | | 455/39 |
| 2005/0130593 A1* | 6/2005 | Michalak | ........... | H04M 1/0258 |
| | | | | 455/66.1 |
| 2006/0229012 A1* | 10/2006 | Tsai | ................... | H04M 1/0258 |
| | | | | 455/41.2 |
| 2008/0074077 A1* | 3/2008 | Wong | ....................... | H02J 5/00 |
| | | | | 320/128 |
| 2009/0046869 A1* | 2/2009 | Griffin, Jr. | ............ | H04R 5/033 |
| | | | | 381/74 |
| 2009/0058707 A1* | 3/2009 | Craze | .................... | H04L 12/10 |
| | | | | 341/176 |
| 2010/0118158 A1* | 5/2010 | Boland | ............. | H04N 5/23293 |
| | | | | 348/376 |
| 2011/0254964 A1* | 10/2011 | Zhang | ................. | H04R 1/1091 |
| | | | | 348/207.1 |
| 2012/0094601 A1* | 4/2012 | Li | ...................... | H04M 1/6066 |
| | | | | 455/41.2 |
| 2012/0185629 A1* | 7/2012 | Kan | .................... | H04M 1/6066 |
| | | | | 710/300 |
| 2014/0098979 A1* | 4/2014 | Osborn | .................... | H04R 5/02 |
| | | | | 381/300 |
| 2014/0273851 A1* | 9/2014 | Donaldson | ............... | H02J 7/02 |
| | | | | 455/41.2 |
| 2015/0150505 A1* | 6/2015 | Kaskoun | .............. | A61B 5/6833 |
| | | | | 600/300 |
| 2016/0360350 A1* | 12/2016 | Watson | ................... | H04W 4/70 |
| 2018/0131847 A1* | 5/2018 | Kokonaski | ........... | H04N 5/2252 |
| 2019/0199907 A1* | 6/2019 | Daulton | ................ | G06F 1/1686 |
| 2020/0110475 A1* | 4/2020 | Files | .................... | G06F 1/1656 |

OTHER PUBLICATIONS

"Wiktionary". Entry 'power brick'. Online Dec. 3, 2013. Retrieved from Internet Aug. 9, 2022. <https://en.wiktionary.org/w/index.php?title=power_brick&oldid=24135771>. (Year: 2013).*

"Wikipedia". Entry 'AC adapter'. Online Dec. 21, 2019. Retrieved from Internet Aug. 9, 2022. <https://en.wikipedia.org/w/index.php?title=AC_adapter&oldid=931887381>. (Year: 2019).*

* cited by examiner

DEVICE CHARGER WITH ACCESSORY BAYS

FIELD

This disclosure relates generally to Information Handling Systems (IHSs), and more specifically, to a device charger with accessory bays.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

The inventors hereof have recognized that, in order to use an accessory or peripheral device (e.g., earbuds, styluses, cameras, etc.) with an Information Handling System (IHS), users should not only own the device, but they should also be able to readily find it. Moreover, in the case of wireless accessories or peripherals, the device's internal battery should be charged prior to its use. Although these requirements may seem relatively straight-forward, they can present real challenges to many users. For example, smaller devices such as styluses and earbuds can get lost inside the user's bag or backpack, run out of battery charge, and so on.

SUMMARY

Embodiments of a device charger with accessory bays are described. In an illustrative, non-limiting embodiment, an Information Handling System (IHS) may include: a processor; and a memory coupled to the processor, the memory having program instructions stored thereon that, upon execution by the processor, cause the IHS to: receive an indication, from a device charger coupled to the IHS, that an accessory has been ejected from the device charger; and in response to the indication, connect to the accessory.

For example, the indication may include a message received via a Universal Serial Bus (USB) Type-C interface. The device charger may be configured to charge an internal battery of the IHS. Moreover, the device charger may be configured to charge an internal battery of the accessory. To connect to the accessory, the program instructions, upon execution, may cause the IHS to pair the accessory to the IHS. For example, IHS ma use a WiFi or BLUETOOTH protocol.

In some cases, prior to connecting to the accessory, the program instructions, upon execution, may cause the IHS to determine that a device charger identification is associated with the IHS. Additionally, or alternatively, the program instructions, upon execution, may cause the IHS to: receive a second indication, from the device charger, that the accessory has been inserted into the device charger; and in response to the second indication, disconnect from the accessory.

For instance, the accessory may include a wireless earbud. The program instructions, upon execution by the processor, may cause the IHS to: select the wireless earbud as an audio output device of the IHS; and de-select a loudspeaker as the audio output device of the IHS. Additionally, or alternatively, the accessory may include a wireless camera. The program instructions, upon execution, may cause the IHS to: detect a position of the wireless camera around a bezel of a display coupled to the IHS; and provide a user interface feature at a location of the display selected based upon the position of the wireless camera.

In another illustrative, non-limiting embodiment, a memory device may have program instructions stored thereon that, upon execution by a microcontroller of a device charger, cause the device charger to: determine that an accessory has been ejected from the device charger; and in response to the indication, transmit a message to an IHS coupled to the device charger to wirelessly connect to the accessory.

For example, the indication may include a message transmitted via a Universal Serial Bus (USB) Type-C interface. The device charger may be configured to charge an internal battery of IHS and an internal battery of the accessory. To wirelessly connect to the accessory, the program instructions, upon execution, may cause the IHS to pair the accessory to the IHS using a WiFi or BLUETOOTH protocol. The accessory may include an earbud, a camera, or a stylus.

In yet another illustrative, non-limiting embodiment, a method may include receiving a message, from a device charger coupled to an IHS, that an accessory has been ejected from the device charger; determining, based upon the message, that the device charger is associated with the IHS; and in response to the determination, connecting the IHS to the accessory.

The accessory may include a wireless camera. The method may include detecting a position of the wireless camera around a bezel of a display coupled to the IHS, and providing a user interface feature at a location of the display selected based upon the position of the wireless camera.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Systems and methods described herein provide a device charger with accessory bays. In various embodiments, a device charger (e.g., a plug pack, plug-in adapter, adapter block, domestic mains adapter, line power adapter, wall wart, power brick, AC adapter, or power adapter) otherwise configured to provide power to and/or charge an internal battery of an Information Handling System (IHS) may also include one or more accessory bays configured to nest accessory or peripheral devices. The accessory bays built into the device charger allow the user to store these devices in designated, predictable places, particularly when not in use. Moreover, the device charger may also be configured to charge the internal batteries of wireless accessory or peripheral devices.

In some cases, a microcontroller or processor within a device charger may be operable to communicate with the IHS, so that the current status of an accessory or peripheral device nested in any given accessory bay (e.g., presence/absence, battery charge level, etc.) may be known by the user, even when the respective device itself is not connected to the IHS—for example, when the device is turned off and/or charging.

Each accessory bay of the device charger may be equipped with a suitable insertion/ejection mechanism (e.g., push-push, etc.) and a sensor (e.g., contact, proximity, ultrasound, hall sensor, etc.). Messages may be exchanged between the device charger and the IHS to enable enhanced operations (e.g., pairing, connecting, switching audio output, etc.), for example, in response to the insertion and/or ejection of the device into/from the device charger.

Figure 1:
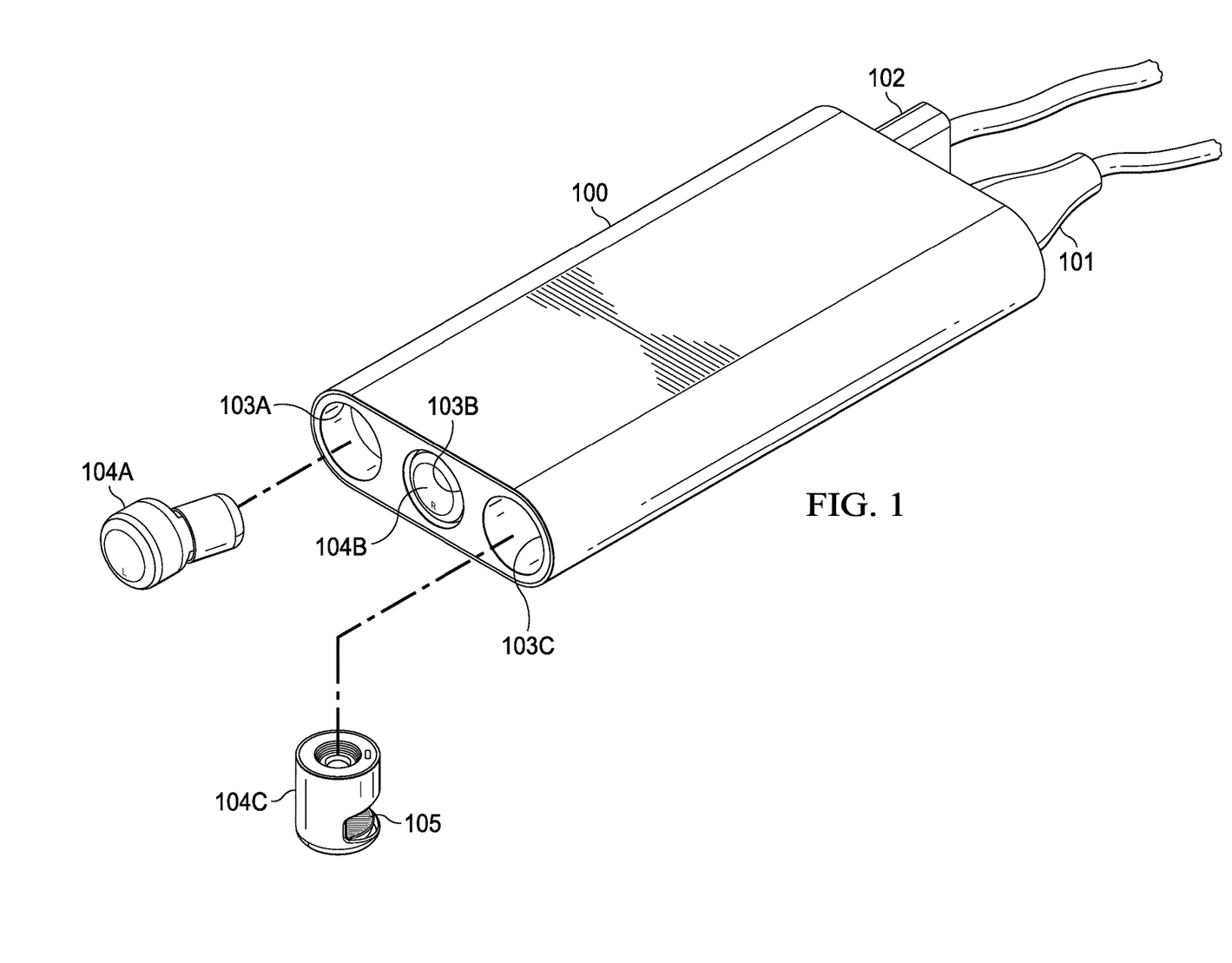
FIG. 1 is a perspective view of an example of a device charger with accessory bays, according to some embodiments.

FIG. 1 is a perspective view of an example of a device charger with accessory bays. In this embodiment, case or body 100 encapsulates various power adapter and/or charger components 200 shown in FIG. 2. AC cord 101 is operable to be coupled to a mains power as its input, and Universal Serial Bus (USB) Type-C cable 102 is plugged into a receptable configured to provide DC output power to an IHS.

In this implementation, the device charger has three accessory bays 103A-C, and each bay is configured to nest or host a respective peripheral or accessory device 104A-C. Examples of peripheral or accessory devices 104A-C may include, but are not limited to, wireless earbuds, cameras, styluses, etc. Each of accessory bays 103A-C may include an otherwise conventional push-push ejection mechanism so that a first push inserts and keeps the device secured inside the bay, and a second push ejects the device from that bay.

As illustrated, FIG. 1 shows a partially ejected wireless earbud 104A, a completely inserted wireless earbud 104B, and an ejected wireless camera 104C. Moreover, in this specific example, wireless camera 104C includes notch 105 configured to attach to the bezel of an IHS's display, as discussed in more detail below. In some cases, camera notch 105 may include a magnet that detectable when camera 104C is mounted on the bezel.

Figure 2:
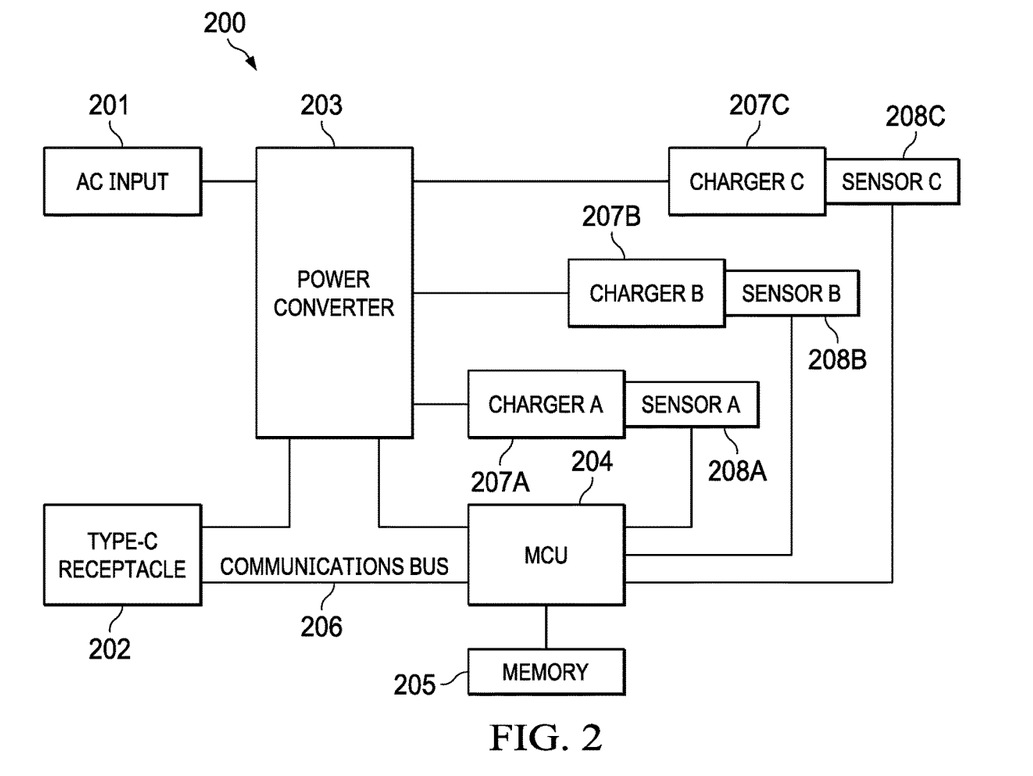
FIG. 2 is a block diagram of examples of internal components of a device charger with accessory bays, according to some embodiments.

FIG. 2 is a block diagram of examples of internal components 200 of a device charger with accessory bays. In some embodiments, components 200 may be encased within body 100 of the device charger of FIG. 1. Particularly, AC input 201 (configured to receive AC cable 101) is coupled to power converter circuitry 203 (e.g., an AC-DC converter, or the like), as is USB Type-C receptacle 202 (configured to receive USB cable 102). Power converter 203 is coupled to microcontroller unit (MCU) 204, which operates based upon program instructions stored in memory 205.

Each of accessory bays 103A-C includes a respective device charger circuitry and/or terminals 207A-C and sensor(s) 208A-C, which are coupled to MCU 204. Examples of sensors 208A-C include, but are not limited to: contact sensors, voltage sensors, current sensors, proximity sensors, ultrasound sensors, hall sensors, etc.

Communications bus 206 enables MUC 204 to transmit and receive messages to and from an IHS coupled to Type-C receptacle 202. In some cases, these messages may follow the USB-C protocol or any other suitable protocol, and they may include an identification of the device charger (e.g., by serial number, etc.) and/or a status of an accessory bay (e.g., full or empty). Moreover, messages communicated by MCU 204 may also include a status of an accessory device 104A-C plugged into a bay 103A-C (e.g., on, off, charging, battery level, etc.), which may be ascertained using a respective one of sensors 208A-C.

Figure 3:
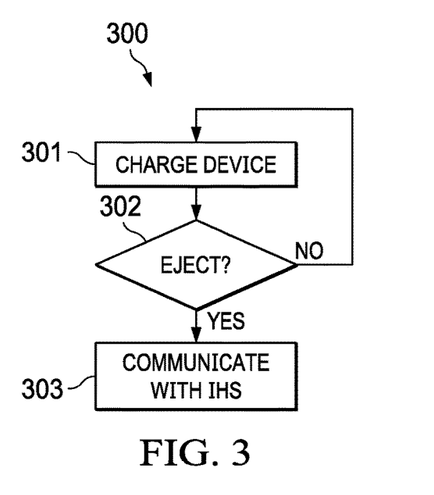
FIG. 3 is a flowchart of an example of a method for operating a device charger with accessory bays, according to some embodiments.

FIG. 3 is a flowchart of an example of method 300 for operating a device charger with accessory bays. In some embodiments, method 300 may be performed by MCU 204 upon execution of program instructions stored in memory 205 of FIG. 2.

At block 301, MCU 204 controls power converter 203 to charge the internal batteries of one or more of devices 104A-C nested within a respective one of accessory bays 103A-C via charger circuitry and/or terminals 207A-C. At block 302, MCU 204 determines, using sensors 208A-C, whether a given one of devices 104A-C is being ejected from its bay, via actuation of a push-push mechanism, by receiving and processing signals received from sensors 208A-C. If not, control returns to block 301.

If at block 303 MCU 204 determines that one of devices 104A-C is being ejected, it sends a message to an IHS coupled to Type-C receptacle 202. For example, the message may identify the charger device and which of devices 104A-C was ejected. Moreover, the message may instruct the IHS to initiate a wireless pairing and/or connection operation with respect to the ejected device, for example, via BLUETOOTH, WiFi, WiFi direct, etc. For instance, in the case of ejected earbuds 104A/B, such a message may instruct the IHS to select the wireless earbud as an audio output device of the IHS and/or de-select an internal loudspeaker as the audio output device of the IHS.

Conversely, if MCU 204 determines that one of devices 104A-C is being inserted into accessory bays 103A-C, MCU 204 sends another message to the IHS instructing the IHS to disconnect from the device. In the case of earbuds 104A/B, that message may instruct the IHS to select the internal loudspeaker as an audio output device of the IHS and/or to de-select the wireless earbud as the audio output device of the IHS.

Figure 4:
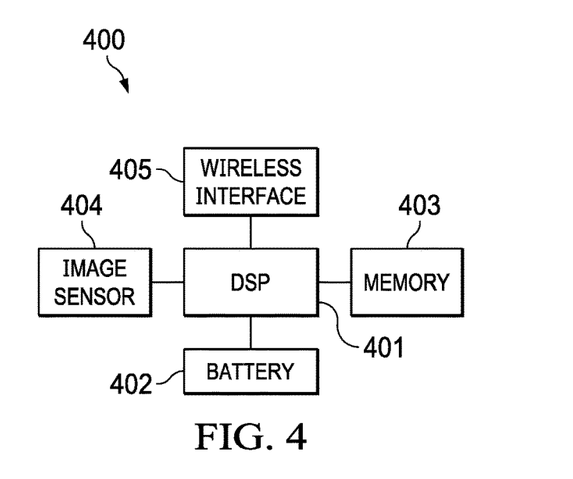
FIG. 4 is a block diagram of examples of internal components of a camera accessory, according to some embodiments.

FIG. 4 is a block diagram of examples of internal components of a camera accessory. In some embodiments, components 400 may be encapsulated within camera 104C of FIG. 1. Particularly, Digital Signal Processor (DSP) 401 is coupled to internal battery 402, memory 403, image sensor 404 (e.g., a charge-coupled device (CCD) or active-pixel sensor (CMOS)), and wireless interface module 405 (e.g., WiFi direct).

In operation, DSP 401 may be powered by battery 402 to execute program instructions stored in memory 403 to acquire and process images and/or video captured using image sensor 404. In various implementations, DSP 401 provides those images and/or video to an IHS using wireless interface 405.

In some embodiments, camera 104C may not include all of components 400 shown in FIG. 4. Additionally, or alternatively, camera 104C may include components in addition to those shown in FIG. 4. Additionally, or alternatively, components represented as discrete in FIG. 4 may be integrated with other components. For example, all or a portion of the functionality provided by the illustrated components may be implemented in a System-On-Chip (SOC), or the like.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 5:
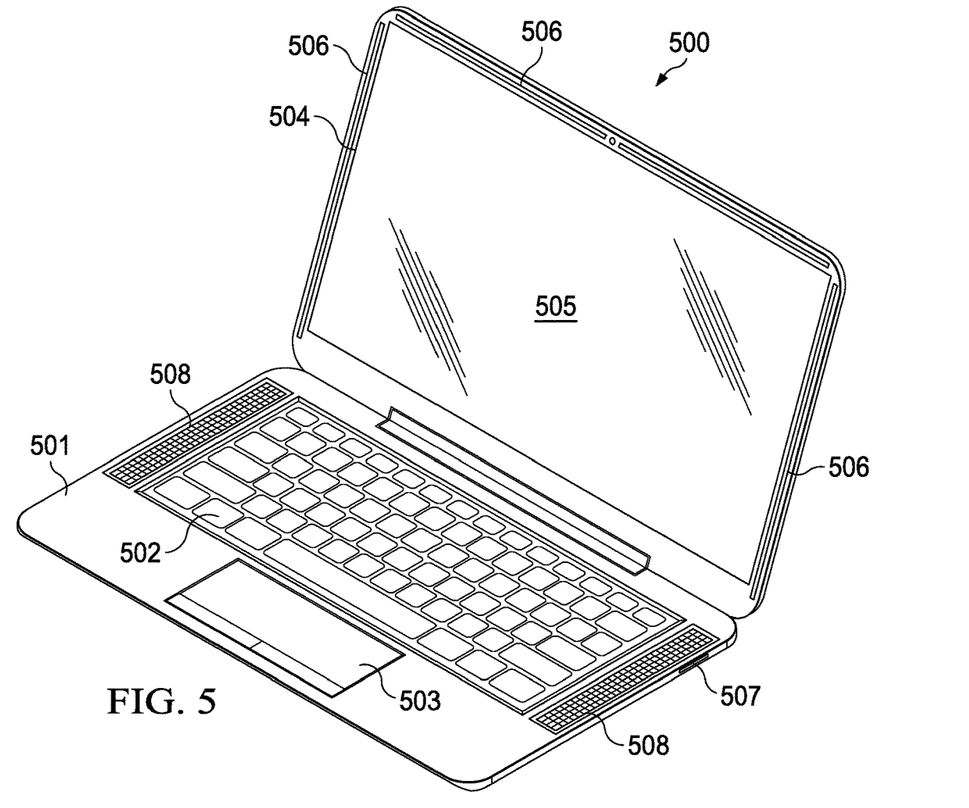
FIG. 5 is a perspective view of an Information Handling System (IHS), according to some embodiments.

FIG. 5 is a perspective view of an example of IHS 500. As shown, IHS 500 includes base or bottom portion 501 fastened to lid or top portion 504. In many implementations, top portion 504 may be pivotably coupled to base portion 501 via a hinge, such that top portion 504 may be moved between a closed position and an open position with respect to base portion 501. In many implementations, different types of hinges may be used to achieve and maintain different display postures, and to support different keyboard arrangements.

In some implementations, top portion 504 may include display 505 (e.g., a touch screen display or the like) configured to present visual content, such as a graphical user interface, still images, video, etc. using any appropriate technology such as a liquid crystal display (LCD), organic light-emitting diode (OLED), etc. Meanwhile, base portion 501 may accommodate user input devices such as keyboard 502 and touchpad 503, as well as other output devices, such as internal loudspeakers 508, and USB port(s) 507. In other implementations, however, base portion 501 may include an additional or secondary display similar to display 505, and the additional display may present another graphical user interface to the user including, for example, in the form of a virtual or on-screen keyboard (OSK), and/or a virtual trackpad.

As shown, the bezel surrounding display 505 in top portion 501 may include one or more sensors 506 configured to detect the presence and position of an accessory mounted thereon, such as, for example camera 104C. For example, sensors 506 may include contact, proximity, ultrasound, hall sensor, etc. configured to detect an attachment via camera notch 105.

Figure 6:
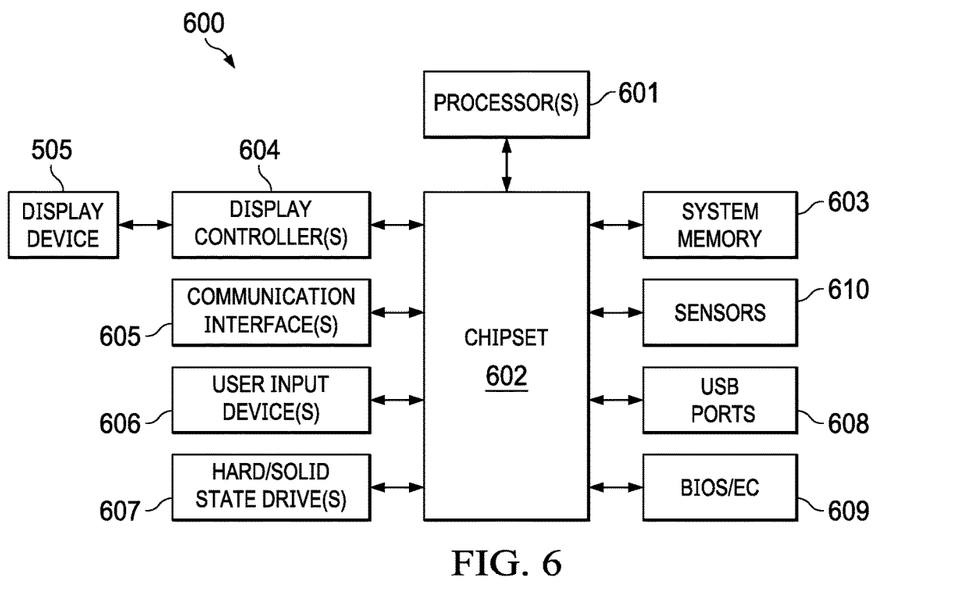
FIG. 6 is a block diagram of an example of internal components of an IHS, according to some embodiments.

FIG. 6 is a block diagram of examples of internal components 600 of IHS 500. As depicted, components 600 include processor 601. In various embodiments, IHS 500 may be a single-processor system, or a multi-processor system including two or more processors. Processor(s) 601 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 500 includes chipset 602 coupled to processor(s) 601. In certain embodiments, chipset 602 may utilize a Quick-Path Interconnect (QPI) bus to communicate with processor(s) 601. In various embodiments, chipset 602 may provide processor(s) 601 with access to a number of resources. Moreover, chipset 602 may be coupled to communication interface(s) 605 to enable communications with other IHSs and/or peripheral devices via various wired and/or wireless networks, such as Ethernet, WiFi, BLUETOOTH, cellular or mobile networks (e.g., CDMA, TDMA, LTE, etc.), satellite networks, or the like. For example, communication interface(s) 605 may be coupled to chipset 602 via a PCIe bus.

Chipset 602 may be coupled to display controller(s) 604, which may include one or more or graphics processor(s) (GPUs) on a graphics bus, such as an Accelerated Graphics Port (AGP) or Peripheral Component Interconnect Express (PCIe) bus. As shown, display controller(s) 604 provide video or display signals to display device 505. In other implementations, however, any number of display controller(s) 604 and/or display devices 103A-N may be used.

Display devices 505 may include a flexible display that is deformable (e.g., bent, folded, rolled, or stretched) by an external force applied thereto. For example, display device 505 may include LCD, OLED, or AMOLED, plasma, electrophoretic, or electrowetting panel(s) or film(s). Moreover, display device 505 may include a plurality of pixels arranged in a matrix, configured to display visual information, such as text, two-dimensional images, video, three-dimensional images, etc.

Display device 505 may be configured to sense haptic and/or physical touch events, and to generate touch information. To this end, display device 505 may include a touchscreen matrix (e.g., a layered capacitive panel or the like) and/or touch controller configured to receive and interpret multi-touch gestures from a user touching the screen with a stylus, or one or more fingers. Generally, display and/or touch control aspects of display device 505 may be collectively operated and controlled by display controller 604.

In some cases, display device 505 may also comprise a deformation or bending sensor configured to generate deformation or bending information including, but not limited to: the bending position of a display (e.g., in the form of a "bending line" connecting two or more positions at which bending is detected on the display), bending direction, bending angle, bending speed, etc. In these implementations, display device 505 may be provided as a single continuous display, rather than two discrete displays.

Chipset 602 may also provide processor 601 and/or display controller(s) 604 with access to memory 603. In various embodiments, system memory 603 may be implemented using any suitable memory technology, such as static RAM (SRAM), dynamic RAM (DRAM) or magnetic disks, or any nonvolatile/Flash-type memory, such as a solid-state drive (SSD) or the like. Memory 603 may store program instructions that, upon execution by processor 601 and/or controller(s) 604, present a UI interface to a user of IHS 100.

Chipset 602 may further provide access to one or more hard disk and/or solid-state drives 607. In certain embodiments, chipset 602 may also provide access to one or more optical drives or other removable-media drives. In certain embodiments, chipset 602 may also provide access to one or more Universal Serial Bus (USB) ports 608.

Upon booting of IHS 500, processor(s) 601 may utilize Basic Input/Output System (BIOS) 609 instructions to initialize and test hardware components coupled to IHS 100 and to load an Operating System (OS) for use by IHS 500. BIOS 609 provides an abstraction layer that allows the OS to interface with certain hardware components that are utilized by IHS 100. Via the hardware abstraction layer provided by BIOS 609, software stored in memory 603 and executed by the processor(s) 601 of IHS 500 is able to interface with certain I/O devices that are coupled to IHS 500. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Chipset 602 may also provide access to one or more user input devices 606, for example, using a super I/O controller or the like. For instance, chipset 602 may provide access to a keyboard (e.g., keyboard 502), mouse, trackpad, stylus, totem, or any other peripheral input device, including touchscreen display 505. These input devices may interface with chipset 602 through wired connections (e.g., in the case of touch inputs received via display controller(s) 604) or wireless connections (e.g., via communication interfaces(s) 605). In some cases, chipset 602 may be used to interface with user input devices such as keypads, biometric scanning devices, and voice or optical recognition devices.

In certain embodiments, chipset 602 and/or EC 609 may provide an interface for communications with one or more sensors 610. Sensors 610 may be disposed within portions 501/502, and/or display 505, and/or the hinge, and may include, but are not limited to: electric, magnetic, hall effect, radio, optical, infrared, thermal, force, pressure, touch, acoustic, ultrasonic, proximity, position, angle, deformation, bending, direction, movement, velocity, rotation, acceleration and/or lid sensor(s). In some cases, one or more sensors 610 may be a part of keyboard 502 when implemented as a removable keyboard (wired or wireless).

In various embodiments, IHS 500 may not include all of components 600 shown in FIG. 6. Additionally, or alternatively, IHS 500 may include components in addition to those shown in FIG. 6. Additionally, or alternatively, components represented as discrete in FIG. 6 may be integrated with other components. For example, all or a portion of the functionality provided by the illustrated components may be implemented in a System-On-Chip (SOC), or the like.

Still referring to FIG. 6, processor(s) 601 may be configured to receive an indication, from a device charger coupled to IHS 500 (via USB-C wire 102), that an accessory has been ejected from the device charger. In response to the indication, IHS 500 may connect (e.g., wirelessly) to the accessory. For example, IHS 500 may perform BLUETOOTH or WiFi paring process with respect to the accessory. In some cases, such as when the same device charger is used with multiple IHSs (not all of which may belong to the same user), prior to connecting to the accessory, IHS 500 may determine that a device charger identification is associated with that IHS.

Processor(s) 601 may also be configured to receive a second indication, from the device charger, that the accessory has been re-inserted into the device charger. Then, in response to the second indication, IHS 500 may disconnect from the accessory.

Figure 7:
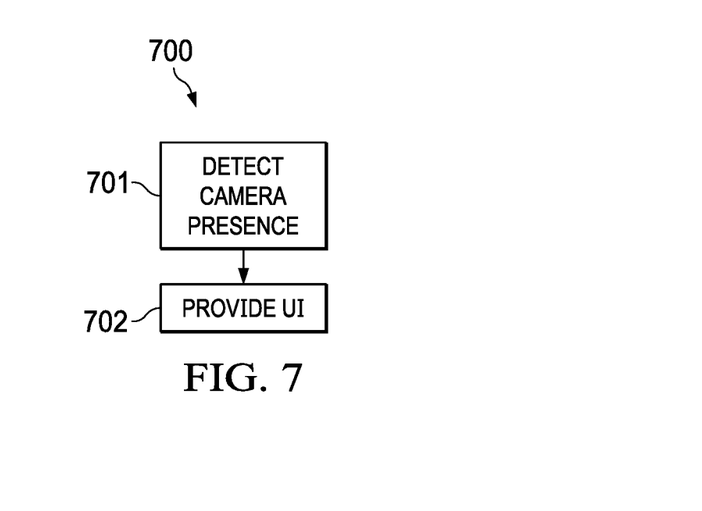
FIG. 7 is a flowchart of an example of a method for deploying a camera accessory, according to some embodiments.

FIG. 7 is a flowchart of an example of method 700 for deploying a camera accessory. In various embodiments, method 700 may be performed by processor(s) 601 of IHS 500 upon execution of program instructions stored in memory 603. Particularly, at block 701, when wireless camera 104C is attached to the bezel of display device 505 using notch 105, IHS 500 may determine the presence and/or position of camera 104C around the bezel using sensors 506 (e.g., sensors 610).

In response, at block 702, IHS 500 provides the user with a graphical user interface (GUI) feature or element that enables the user to control certain programmable aspects of the camera (e.g., turn it on, zoom in and out, start an application, open/close/re-arrange application windows, make a video call, etc.).

In various embodiments, the aforementioned features may enable further reducing the size and/or width of display bezels and open up new ways of using a camera, such as, for example, by allowing the user to take a snapshot of something that is not in front of display 505 or to show something to an audience during a video call.

Figure 8A:
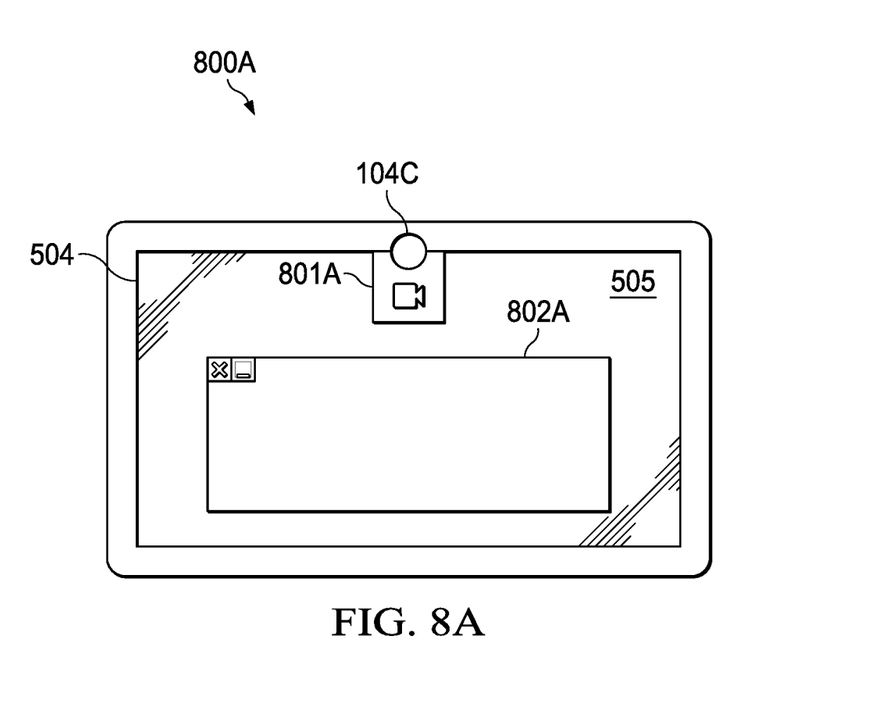
FIGS. 8A-C are diagrams of examples of repositioned user interface elements in response to the position of a camera accessory on an IHS display, according to some embodiments.
Figure 8B:
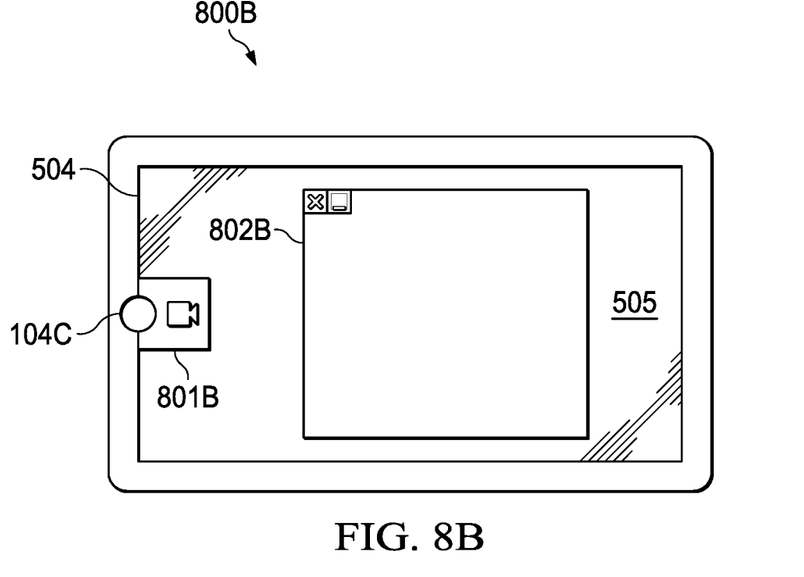
Figure 8C:
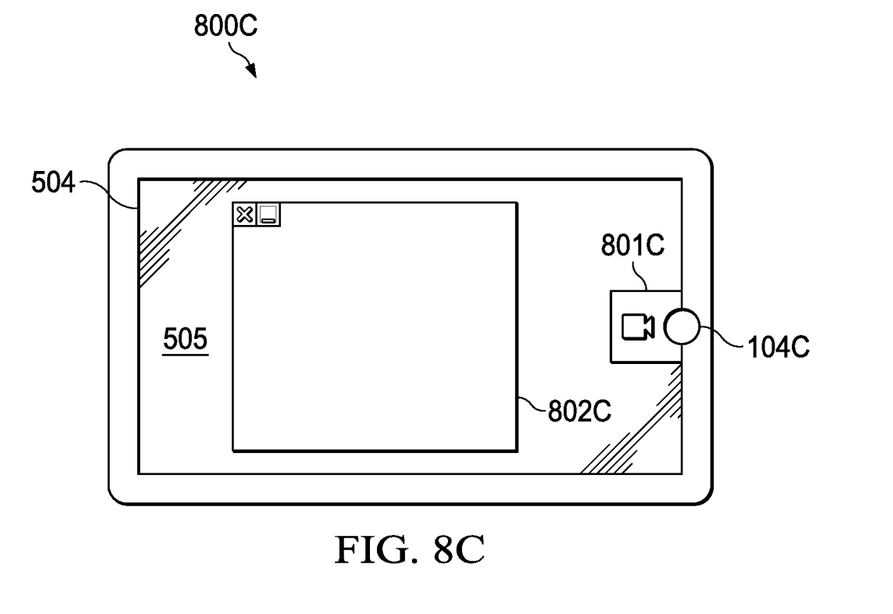

To illustrate the foregoing, FIGS. 8A-C are diagrams of examples of repositioned user interface elements in response to the position of a camera accessory on an IHS display, according to some embodiments. Particularly, in FIG. 8A, camera 104C is positioned at the top edge of display 505, and in response IHS 500 produces icon 801A (e.g., an icon representing a camera) that, upon activation or selection (e.g., using a pointing device, trackpad, or touch) turns the capture of camera 104C on and/or opens application window 802A immediately below it.

In FIG. 8B, camera 104C is positioned on the left edge of display 505, and in response IHS 500 produces icon 801B next to it and application window 802A immediately to the right of it. Conversely, in FIG. 8C, camera 104C is positioned on the right edge of display 505, and in response IHS 500 produces icon 801B next to it and application window 802C immediately to the left of it.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution by the processor, cause the IHS to:
      receive an indication, from a power brick coupled to the IHS, that an accessory has been ejected from the power brick, wherein the power brick is configured to have at least one accessory bay encased within the body of the power brick capable of charging an internal battery of the accessory, and wherein the power brick is configured to charge an internal battery of the IHS by converting an AC input to a DC output; and
      in response to the indication, connect to the accessory.

2. The IHS of claim 1, wherein the indication comprises a message received via a Universal Serial Bus (USB) Type-C interface.

3. The IHS of claim 1, wherein each of the least one accessory bay comprises a device charger circuitry and at least one sensor.

4. The IHS of claim 3, wherein the program instructions, upon execution by the processor, further cause the IHS to receive a status message from the power brick about a status of the accessory device from the at least one sensor including at least one of: on, off, charging, or battery level.

5. The IHS of claim 1, wherein to connect to the accessory, the program instructions, upon execution, further cause the IHS to pair the accessory to the IHS.

6. The IHS of claim 1, wherein to connect to the accessory, the program instructions, upon execution, further cause the IHS to use a WiFi or BLUETOOTH protocol.

7. The IHS of claim 1, wherein prior to connecting to the accessory, the program instructions, upon execution, further cause the IHS to determine that a power brick identification is associated with the IHS.

8. The IHS of claim 1, wherein the program instructions, upon execution by the processor, further cause the IHS to:
   receive a second indication, from the power brick, that the accessory has been inserted into the power brick; and
   in response to the second indication, disconnect from the accessory.

9. The IHS of claim 1, wherein the accessory comprises a wireless earbud.

10. The IHS of claim 9, wherein the program instructions, upon execution by the processor, further cause the IHS to:
    select the wireless earbud as an audio output device of the IHS; and
    de-select a loudspeaker as the audio output device of the IHS.

11. The IHS of claim 1, wherein the accessory comprises a wireless camera.

12. The IHS of claim 11, wherein the program instructions, upon execution by the processor, further cause the IHS to:
    detect a position of the wireless camera around a bezel of a display coupled to the IHS; and
    provide a user interface feature at a location of the display selected based upon the position of the wireless camera.

13. A memory device having program instructions stored thereon that, upon execution by a microcontroller of a device charger, cause the device charger to:
    determine that a stylus has been ejected from the device charger, wherein the device charger is configured to have at least one accessory bay encased within the body of the device charger capable of charging an internal battery of the stylus, and wherein the device charger is configured to charge an internal battery of the IHS by converting an AC input to a DC output; and
    in response to the indication, transmit a message to an Information Handling System (IHS) coupled to the device charger to wirelessly connect to the stylus.

14. The memory device of claim 13, wherein the indication comprises a message transmitted via a Universal Serial Bus (USB) Type-C interface.

15. The memory device of claim 13, wherein the program instructions, upon execution, further cause the device charger to:
    determine a status of the stylus based on data from at least one sensor coupled to the accessory bay; and
    transmit a status message to the IHS.

16. The memory device of claim 13, wherein to wirelessly connect to the accessory, the program instructions, upon execution, further cause the IHS to pair the accessory to the IHS using a WiFi or BLUETOOTH protocol.

17. A method, comprising:
    receiving a message, from a device charger coupled to an Information Handling System (IHS), that an accessory has been ejected from the device charger through actuation of a push-push mechanism, wherein the device charger is configured to have at least one accessory bay encased within the body of the device charger capable of charging an internal battery of the accessory and wherein the device charger is configured to charge an internal battery of the IHS by converting an AC input to a DC output;
    determining, based upon the message, that the device charger is associated with the IHS; and
    in response to the determination, connecting the IHS to the accessory.

18. The method of claim 17, wherein the accessory comprises a wireless camera.

19. The method of claim 18, further comprising:
    detecting a position of the wireless camera around a bezel of a display coupled to the IHS; and providing a user interface feature at a location of the display selected based upon the position of the wireless camera.

\* \* \* \* \*